(12) United States Patent
Yi et al.

(10) Patent No.: US 8,050,454 B2
(45) Date of Patent: Nov. 1, 2011

(54) PROCESSING DIGITAL VIDEO USING TRAJECTORY EXTRACTION AND SPATIOTEMPORAL DECOMPOSITION

(75) Inventors: Haoran Yi, Urbana, IL (US); Igor Kozintsev, San Jose, CA (US); Marzia Polito, Burbank, CA (US)

(73) Assignee: Intel Corporation, Santa Clara, CA (US)

( * ) Notice: Subject to any disclaimer, the term of this patent is extended or adjusted under 35 U.S.C. 154(b) by 1131 days.

(21) Appl. No.: 11/618,410

(22) Filed: Dec. 29, 2006

(65) Prior Publication Data

US 2008/0159590 A1  Jul. 3, 2008

(51) Int. Cl.
*G06K 9/00* (2006.01)
(52) U.S. Cl. .................. 382/103; 382/100; 382/190
(58) Field of Classification Search ................ 382/100, 382/103, 190; 725/113; 348/143; 345/473, 345/475
See application file for complete search history.

(56) References Cited

U.S. PATENT DOCUMENTS

| 6,636,220 | B1 * | 10/2003 | Szeliski et al. | 345/475 |
| 6,804,398 | B2 * | 10/2004 | Kaneko et al. | 382/190 |
| 7,085,401 | B2 * | 8/2006 | Averbuch et al. | 382/103 |
| 7,200,266 | B2 * | 4/2007 | Ozer et al. | 382/173 |
| 7,840,076 | B2 | 11/2010 | Bouguet et al. | |
| 2006/0066719 | A1 * | 3/2006 | Haering et al. | 348/143 |
| 2008/0052262 | A1 | 2/2008 | Kosinov et al. | |
| 2008/0240575 | A1 | 10/2008 | Panda et al. | |

OTHER PUBLICATIONS

Costeira and Kanade "A Muiltibody Factorization Method for Independently Moving Objects" International Journal on Computer Vision, pp.159-179, 1998.*
Lowe "Distinctive Image Features from Scale-Invariant Keypoints," European Conference on Computer Vision, pp. 128-132, 2002.*
Gruber and Weiss "Incorporating Non-motion Cues into 3D Motion Segmentation" Proceedings of the European Conference on Computer Vision, May 2006.*
Shi and Malik "Normalized Cuts and Image Segmentation" IEEE Transactions on Pattern Analysis and Machine Intelligence, vol. 22 No. 8 Aug. 2000.*
"Diamond: A System for Interactive Search," Dec. 16, 2006 [retrieved from http://replay.web.archive.org/20061216083539/ http://diamond.cs.cmu.edu/ on May 5, 2011] 1 pages.
"TREC Video Retrieval Evaluation," Sep. 30, 2006 [retrieved from http://replay.web.archive.org/20060930001855/http://www-nlpir. nist.gov/projects/trecvid/ on May 5, 2011] 2 pages.
"Espion Video Search," Dec. 14, 2006 [retrieved from http://replay. web.archive.org/20061214085003/http://ideeinc.com/espion-video. php on May 5, 2011] 1 page.

(Continued)

*Primary Examiner* — Stephen Koziol
(74) *Attorney, Agent, or Firm* — Hanley, Flight and Zimmerman, LLC (57) ABSTRACT

Methods to process digital video using trajectory extraction and spatiotemporal decomposition for search and retrieval of video are described. An example method extracts interest point data from data representing a plurality of video frames. The interest point data is extracted from each of the video frames independent of the other video frames. Subsequent to extracting the interest point data, the example method links at least some of the interest point data to generate corresponding trajectory information. The example method also clusters the trajectory information to form clustered trajectory information and extracts a representative feature index from the clustered trajectory information.

15 Claims, 6 Drawing Sheets

OTHER PUBLICATIONS

Goode et al., "Interactive Search of Adipocytes in Large Collections of Digital Cellular Images," Technical Report CMU-CS-06-177, School of Computer Science, Carnegie Mellon University, Dec. 2006, 16 pages.

Huston et al., "Dynamic Load Balancing for Distributed Search," Proceedings of High Performance Distributed Computing, 2005, 10 pages.

Nizhner et al., "Network-Aware Partitioning of Computation in Diamond," Carnegie Mellon Technical Report CMU-CS-04-148, Jun. 2004, 22 pages.

Huston et al., "SnapFind: Brute Force Interactive Image Retrieval," Proceedings of International Conference on Image Processing and Graphics, 2004, 6 pages.

Huston et al., "Forensic Video Reconstruction," Proceedings of International Workshop on Video Surveillance and Sensor Networks, Oct. 15, 2004, 9 pages.

Hoiem et al., "Object-Based Image Retrieval Using the Statistical Structure of Images," Proceedings of Computer Vision and Pattern Recognition, 2004, 8 pages.

Huston et al., "Diamond: A Storage Architecture for Early Discard in Interactive Search," Proceedings of USENIX Conference on File and Storage Technologies, 2004, 14 pages.

Veltkamp et al., "Content-Based Image Retrieval Systems: A Survey," Utrecht University, Oct. 28, 2002, pp. 1-62.

Muller et al., "Benchmarking Image Retrieval Applications," Proceedings of the Seventh International Conference on Visual Information Systems, San Francisco, USA, Sep. 2004, 4 pages.

Muller et al., "Performance Evaluation in Content-Based Image Retrieval: Overview and Proposals," Technical Report 99.05, University of Geneva, Dec. 1, 1999, 12 pages.

Hauptmann et al., "Successful Approaches in the TREC Video Retrieval Evaluations," in Proceedings of ACM Multimedia, Oct. 10-16, 2004, pp. 668-675.

Peker et al., "Low-level Motion Activity Features for Semantic Characterization of Video," in Proceedings of IEEE International Conference on Multimedia and Expo, 2000, 4 pages.

Yi et al., "A New Motion Histogram to Index Motion Content in Video Segments," Pattern Recognition Letters 26(9), Dec. 15, 2004, pp. 1221-1231.

DeMenthon et al., "Video Retrieval Using Spatio-Temporal Descriptors," in Proceedings of ACM Multimedia, Nov. 2-8, 2003, 10 pages.

Elgammal et al., "Non-Parametric Model for Background Subtraction," in Proceedings IEEE ICCV, Sep. 1999, 17 pages.

Harris et al., "A Combined Corner and Edge Detector," in Fourth Alvey Vision Conference, 1988, pp. 147-152.

Mikolajczyk et al., "An Affine Invariant Interest Point Detector," in European Conference on Computer Vision, 2002, 15 pages.

Mikolajczyk et al., "A Performance Evaluation of Local Descriptors," in IEEE CVPR, Feb. 23, 2005, 34 pages.

Deng et al., "Unsupervised Segmentation of Color-Texture Regions in Images and Video," IEEE Transactions on Pattern Analysis and Machine Intelligence 12, May 10, 2001, pp. 1-27.

Bouguet et al., "Requirements for Benchmarking Personal Image Retrieval Systems," Intel Corporation, Jan. 7, 2006, 12 pages.

Wu et al., "Sampling Strategies for Active Learning in Personal Photo Retrieval," Content Understanding III, ICME, Toronto, Canada, Jul. 2006, 4 pages.

Jing et al., "A Unified Framework for Image Retrieval Using Keyword and Visual Features," Proceedings IEEE Transactions on Image Processing, Jul. 7, 2005, p. 979-989.

Rui et al., "Image Retrieval: Current Techniques, Promising Directions, and Open Issues," Journal of Visual Communication and Image Representation 10, pp. 39-62, 1999.

Zhou et al., "Image Retrieval: Feature Primitives, Feature Representation, and Relevance Feedback," IEEE Workshop on Content-based Access of Image and Video Libraries, 2000, 6 pages.

Chang et al., "Support Vector Machine Active Learning for Image Retrieval," Proceedings of the ninth ACM international conference on Multimedia, 2001, 24 pages.

Zhou et al., "Relevance Feedback in Image Retrieval: A Comprehensive Review," Multimedia Systems, 2003, 25 pages.

Rui et al., "Relevance Feedback: A Power Tool for Interactive Content-Based Image Retrieval," IEEE Transactions on Circuits and Systems for Video Technology, 1998, 13 pages.

Crucianu et al., "Relevance Feedback for Image Retrieval: a Short Survey," Report of the DELOS2 European Network of Excellence, Oct. 10, 2004, 21 pages.

Chang et al., "Support Vector Machine Concept-Dependent Active Learning for Image Retrieval," IEEE Transactions on Multimedia, 2005, 35 pages.

Lim et al., "Home Photo Content Modeling for Personalized Event-Based Retrieval," IEEE Multimedia, 2003, 10 pages.

Vinay et al., "Comparing Relevance Feedback Algorithms for Web Search," Proceedings of the World Wide Web Conference, 2005, 2 pages.

Wang et al., "SIMPLIcity: Semantics-Sensitive Integrated Marching for Picture Libraries," IEEE Transactions on Pattern Analysis and Machine Intelligence, Sep. 2001, 17 pages.

Carson et al., "Blobworld: Image Segmentation Using Expectation-Maximization and Its Application to Image Querying," IEEE Transactions on Pattern Analysis and Machine Intelligence, pp. 1026-1038, Aug. 2002.

Sivic et al., "Efficient Object Retrieval From Videos," Proceedings of the 12th European Signal Processing Conference, Vienna, Austria, 2004, 4 pages.

Wu et al., "Optimal Multimodal Fusion for Multimedia Data Analysis," Proceedings of the ACM International Conference on Multimedia, 2004, 8 pages.

Chang, et al., "Image Information Systems: Where Do We Go From Here?" IEEE Transactions on Knowledge and Data Engineering, vol. 4, No. 5, Oct. 1992, (12 pages).

Ke, et al, "Efficient Near-duplicate Detection and Sub-image Retrieval," MM '04, Oct. 10-16, 2004, (8 pages).

Bradshaw, John, "Introduction to Tversky similarity measure," MUG '97, Annual Daylight User Group Meeting, Feb. 26, 1997, 7 pages.

Tamura et al., "Image Database Systems: A Survey," Pattern Recognition, 1984, pp. 29-43.

Intelligent Information Management Dept. IBM T.J. Watson Research Center, "Marvel: Mpeg-7 multimedia search engine," [retrieved from http://www.research.ibm.com/marvel/ on Nov. 22, 2006] 2 pages.

Manjunath et al., "Introduction to MPEG 7: Multimedia Content Description Language," John Wiley & Sons, 2002, pp. 179-185, 187-229, 231-280.

\* cited by examiner

PROCESSING DIGITAL VIDEO USING TRAJECTORY EXTRACTION AND SPATIOTEMPORAL DECOMPOSITION

FIELD OF THE DISCLOSURE

The present disclosure relates generally to digital video processing and, more particularly, to processing digital video using trajectory extraction and spatiotemporal decomposition for search and retrieval of digital video.

BACKGROUND

Personal digital video photography is increasing in popularity while, at the same time, the cost of digital storage media continues to decrease. As a result, the number of libraries of stored digital media continues to increase. For example, many consumers hold large libraries of digital media and, thus, the need to search and retrieve vast amounts of stored video data has increased significantly.

Due to the large amounts of data associated with each video element (e.g., segment, clip, etc.), current video search and retrieval methods are typically not suited to accurately locate video elements stored in a library. Instead of relying on keyword annotation for indexing and search, visual image features are typically used to search and retrieve video elements. However, known video search and retrieval methods using a single frame are typically not very accurate because video has a temporal aspect or dimension that such single frame techniques do not consider. Other known video search and retrieval methods may use explicit object tracking across multiple frames. However, with these object tracking techniques it is difficult to track a selected object when other objects enter or leave a scene (e.g., a video element, clip, etc.)

In yet another known method for extracting representative data from a video element, the entire video element is analyzed and a set of locally distinctive points are extracted from the pixels of the complete video element. The extracted points are then processed using a hierarchical mean shift analysis. In particular, using mean shift analysis and implementing a fine to coarse evaluation, with iterations expanding the radius of interest, the calculations eventually encompass a single region corresponding to the whole set of pixels. Thus, all of the pixels from the entire video element are processed at one time, resulting in a complete but computationally and memory intensive representation for video indexing and retrieval.

DETAILED DESCRIPTION

The example methods described herein address the problems related to the search and retrieval of video images by implementing trajectory extraction and spatiotemporal decomposition. More specifically, one example described herein includes a method for selecting interest points of a video element (e.g., video frame(s), a video clip, etc.). The interest points may be selected and/or extracted from each frame independent of other frames using a scale invariant feature transform (SIFT) point detector. In addition, the example method combines interest point chaining or linking, trajectory clustering, and image segmentation to decompose the video data into a set of spatiotemporal regions (ST-regions). The decomposed ST-regions may then be regarded as individual objects or clusters in the context of video indexing and retrieval. Furthermore, extracting a representative feature index from the clustered trajectory information enables the process to be used in the search and retrieval of media data in a media database.

By extracting interest points from each of the video frames and chaining or linking together the interest points between frames, a set of trajectories can be obtained. The set of trajectories for interest points can then be tracked over the entire video element (i.e., over a plurality of frames). Trajectory clustering may also be used to group the trajectories into independent motions or clustered trajectory information such as, for example, object (e.g., moving object or foreground) trajectories and background trajectories. The measurement of how likely two trajectories belong to the same motion group or trajectory cluster (e.g., the same object) can be derived from a shape matrix. The foreground and background clusters may be grouped together using spatial and temporal reference points, or clues. Trajectories obtained for interest points may be clustered into foreground and background clusters as discussed in greater detail below in connection with FIGS. 4A, 4B, and 4C. The clustered trajectories may then be used to extract a representative feature index from the trajectories for indexing as discussed in greater detail in connection with FIGS. 5A and 5B.

A more detailed discussion involving an example method for processing digital video using trajectory extraction and spatiotemporal decomposition for search and retrieval of video images is now provided below in connection with FIG. 1.

Figure 1:
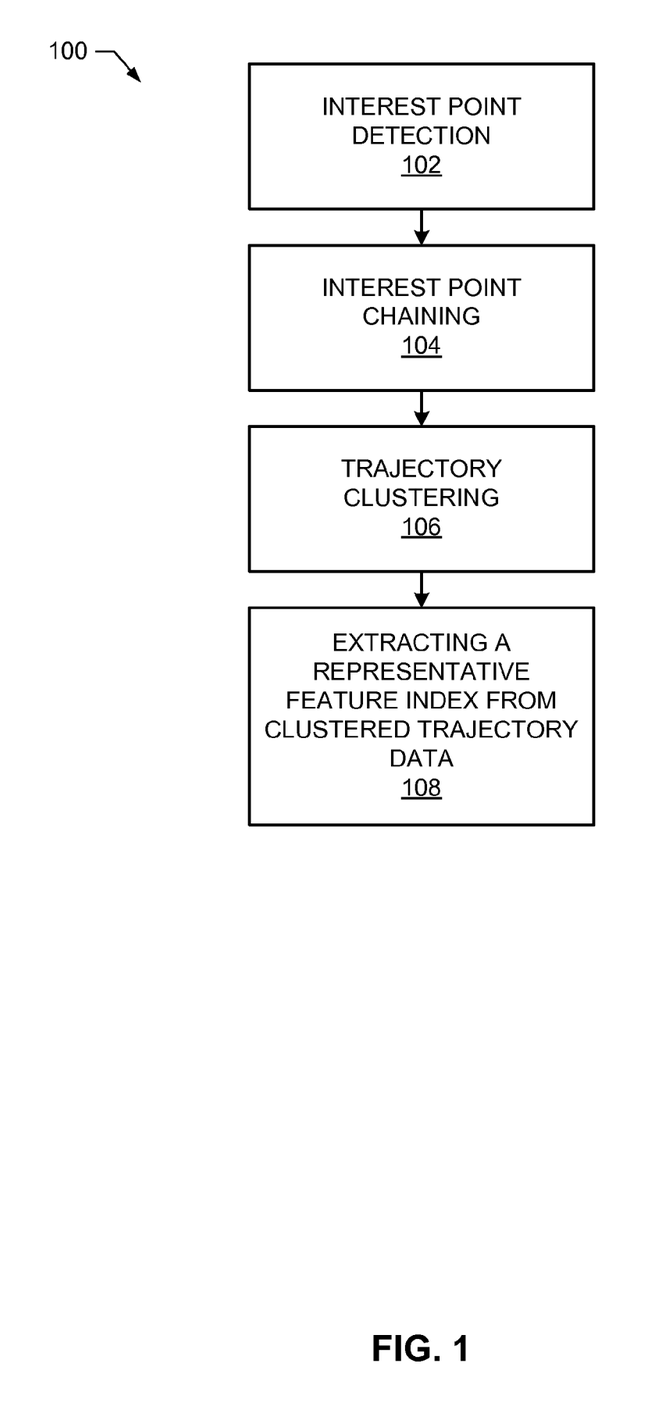
FIG. 1 is a flowchart of an example method for processing digital video using trajectory extraction and spatiotemporal decomposition.

FIG. 1 described in greater detail below depicts a block diagram representative of an example method that may be used to implement the example methods described. In some example implementations, the example method may be implemented using machine readable instructions comprising a program for execution by a processor (e.g., the processor 612 shown in the example processor system 610 of FIG. 6). The program may be embodied in software stored on a tangible medium such as a CD-ROM, a floppy disk, a hard drive, a digital versatile disk (DVD), or a memory associated with the processor 612 and/or embodied in firmware and/or dedicated hardware in a well-known manner. Further, although the example program is described with reference to the flowchart illustrated in FIG. 1, persons of ordinary skill in the art will readily appreciate that many other methods of implementing the example method 100 may alternatively be used. For example, the order of execution of the blocks may be changed, and/or some of the blocks described may be changed, eliminated, or combined.

Turning in detail to FIG. 1, a flowchart of the example method for processing digital video using automatic moving trajectory extraction begins with the decomposition the three dimensional digital video and the detection, selection, or extraction of interest points (block 102). The interest points (or interest point data) may be detected, selected, or extracted using the known method of scale invariant feature transform (SIFT). The SIFT technique, which provides a reliable and efficient interest point detection method, was originally introduced by Lowe ("Distinctive image features from scale-invariant keypoints," European Conference on Computer Vision pp. 128-132, 2002), the entire disclosure of which is incorporated by reference herein in its entirety.

Figure 2:
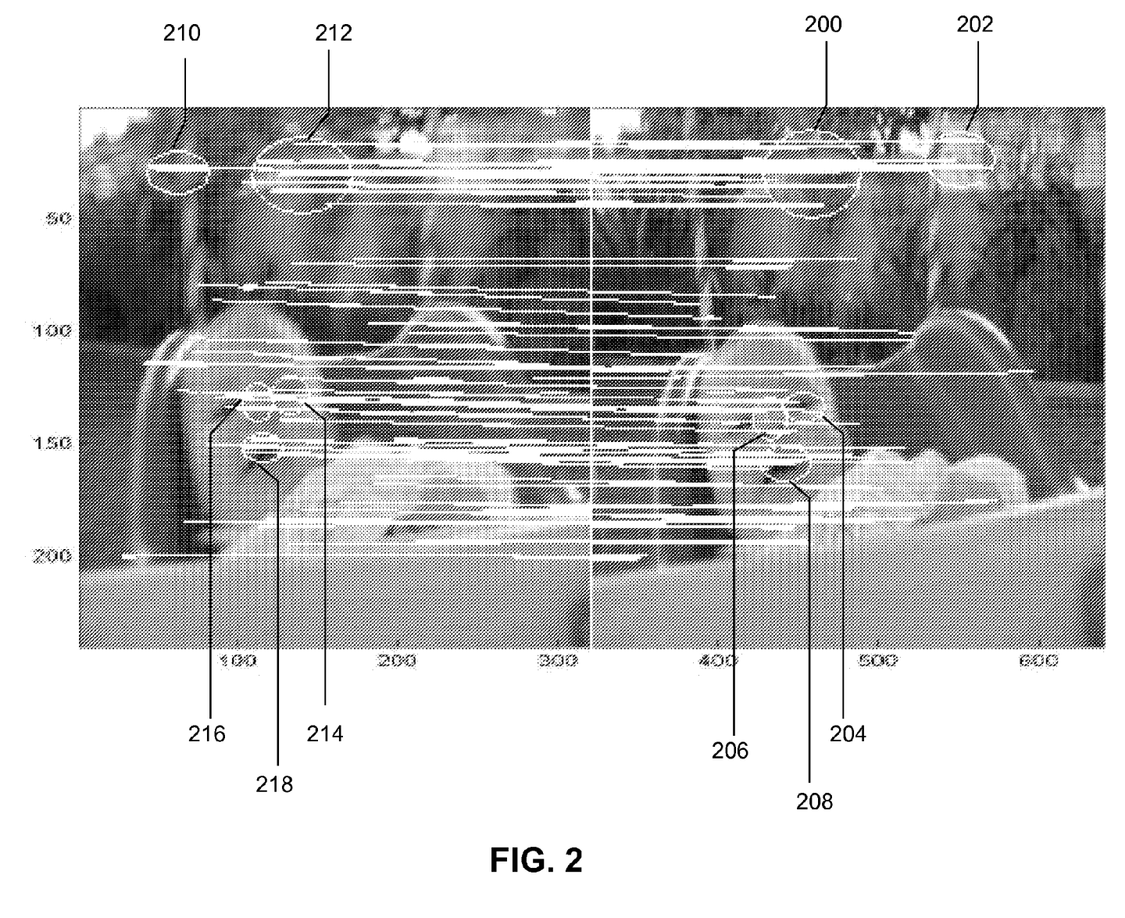
FIG. 2 depicts scale invariant feature transform interest point detection on chaining adjacent video frames.

FIG. 2 displays left and right images of SIFT points or more generally, interest point data detected on two different frames of an example video of a swinging baby. As shown in FIG. 2, two adjacent frames contain distinct interest points on the swinging baby. In particular, foreground points 204, 206, 208, 214, 216, and 218 (i.e. eyes, nose, mouth, etc.) and background points 200, 202, 210, and 212 (i.e. bushes, branches, etc.) have been identified or detected using the SIFT technique. A large number of features generated for each interest point can densely cover the image over the full range of scales and locations. Therefore, cluster analysis for an interest point enables the detection and segmentation of pixels that belong to color patches evolving over each frame.

Returning to FIG. 1, following the detection, selection, or extraction of interest points (block 102) for all of the frames of the video element being analyzed, the interest points or interest point data is linked or chained (block 104). In other words, interest points between two or more temporally adjacent video frames are linked or chained together. In this manner, all of the video frames being processed are first spatially processed (i.e., in a first pass) at block 102 to detect, select, or extract interest point data or, more generally, spatial information. Subsequent to the spatial processing at block 102, the interest point data or information is temporally processed (e.g., linked, chained, etc.) in a second pass. As a result of splitting the spatial operations or processing of block 102 and the temporal operations of block 104, the total amount of data processed temporally is substantially reduced in comparison to some known digital video processing techniques that spatially and temporally process all of the data associated with all of the video frames being analyzed. The interest point linking or chaining operations at block 104 may be performed by generating and comparing similarity scores. In particular, for each frame, the similarity between interest points as well as the correspondence between the interests points may be determined as set forth below.

The measure of similarity between two interest points, i and j, is defined as the cosine of the angle between the two SIFT histogram descriptors as shown in Equation 1 below.

$$\cos \theta_{ij} = Des(i) \cdot Des(j) \quad (1)$$

Where Des (i) and Des (j) are the normalized SIFT histogram descriptors for interest points i and j. The correspondence of the interest points may be computed for each interest point, x, in frame n, for the most similar point, y, and the next most similar point, z, in the next frame n+1. If the ratio, $$\frac{\cos \theta_{x,y}}{\cos \theta_{x,z}}$$

is larger than a predetermined threshold, interest points x and y are considered to correspond. There is no absolute threshold on the value of similarities and the extracted correspondences of points are highly distinctive.

The frame-by-frame correspondence of the interest points are linked or chained across temporally adjacent frames to generate a set of short trajectories. However, the interest point chaining or linking can be performed between frames with a fixed interval rather than for every consecutive frame, thereby further reducing the amount of data to process.

Figure 3:
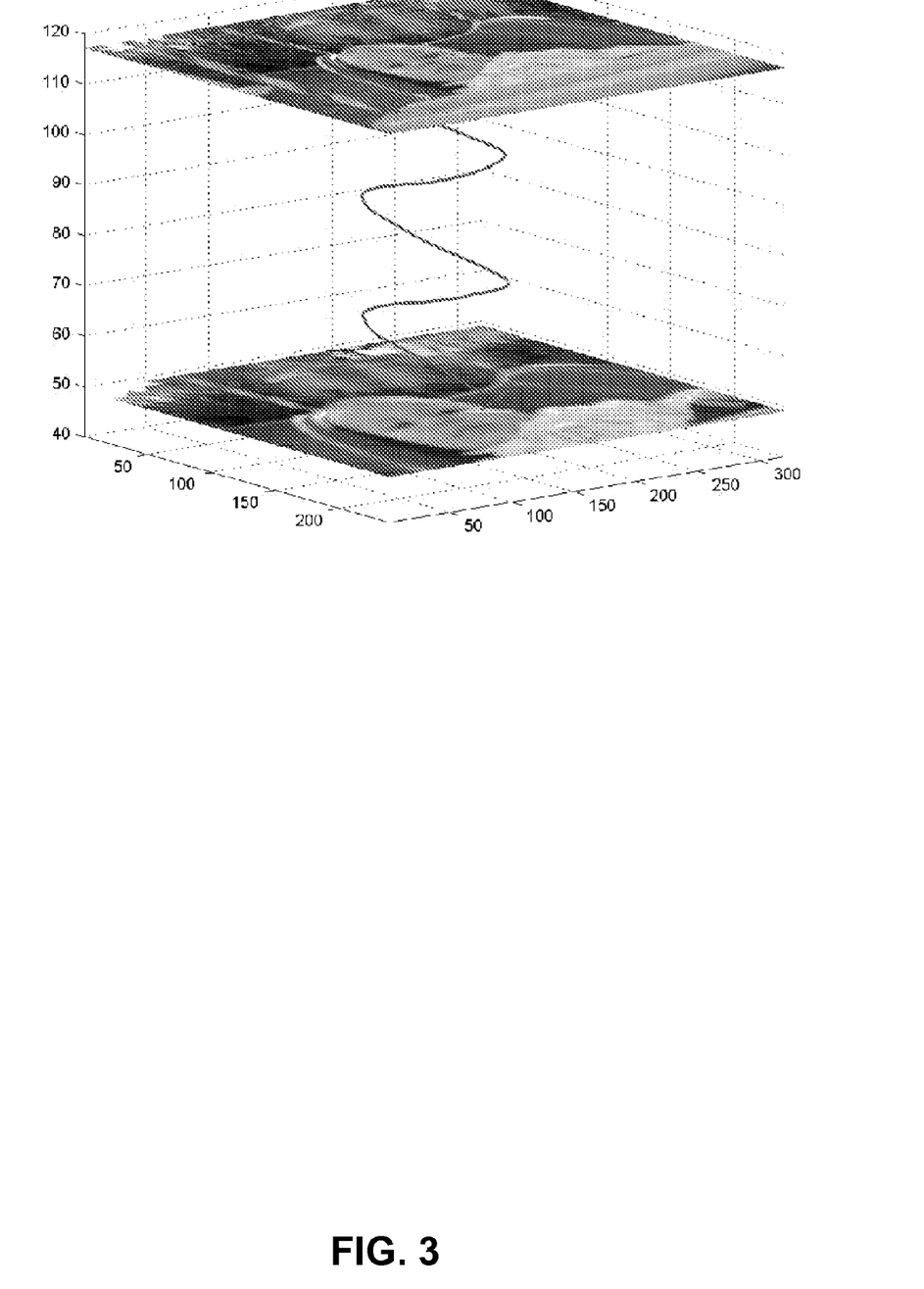
FIG. 3 depicts an example trajectory obtained by chaining or linking interest points between frames.

Following the linking of interest points or interest point data at block 104, short trajectories are clustered to form clustered trajectory information (e.g., background clusters, foreground clusters, etc.) to achieve spatiotemporal decomposition (block 106). The trajectory clustering operation at block 106 groups the trajectories into independent motions such as object (e.g., foreground) trajectories and background trajectories. The motion associated with the grouped trajectories is shown in FIG. 3. The trajectory depicted in FIG. 3 corresponds to interest points on the baby's cheek that are chained across different frames. The resulting motion is sinusoidal reflective of the motion of the swinging baby as discussed further in connection with FIG. 5A.

The measurement of the likelihood that two trajectories belong to the same motion group can be derived from a shape matrix according to the multibody motion factorization framework described by Costeira and Kanade ("A Multibody Factorization method for Independently Moving-Objects," International Journal on Computer Vision, pp. 159-179, 1998), the entire disclosure of which is incorporated by reference herein in its entirety.

If there are N independently moving objects in a sequence of video images (e.g., a scene) and each object contains $n_i$ 3D points the homogenous coordinates of these objects are represented as a $4 \times n_i$ matrix $S_i$, $$S_i = \begin{bmatrix} x_i^1 & x_i^2 & \cdots & x_i^{n_i} \\ y_i^1 & y_i^2 & \cdots & y_i^{n_i} \\ z_i^1 & z_i^2 & \cdots & z_i^{n_i} \\ 1 & 1 & \cdots & 1 \end{bmatrix} \quad (2)$$

When a linear projection (i.e., parapersitive, orthographic, affine etc.) is assumed, it is possible to collect and stack the corresponding projected image coordinates (u, v) of these $n_i$ points over F frames into a $2F \times n_i$ matrix $W_i$, $$W_i = M_i \cdot S_i \quad (3)$$

where $$W_i = \begin{bmatrix} u_{1,1} & \cdots & u_{1,n_i} \\ v_{1,1} & \cdots & v_{1,n_i} \\ u_{2,1} & \cdots & u_{2,n_i} \\ v_{2,1} & \cdots & v_{2,n_i} \\ \cdots & \cdots & \cdots \\ u_{F,1} & \cdots & u_{F,n_i} \\ v_{F,1} & \cdots & v_{F,n_i} \end{bmatrix} \text{ and } M_i = \begin{bmatrix} M_{i,1} \\ M_{i,2} \\ \cdots \\ M_{i,F} \end{bmatrix}$$

Each column of $W_i$ contains the observations from a single point over F frames and each row contains the observed u coordinates or v coordinates for a single frame. $M_i$ is a $2F \times 4$ matrix and $M_{i,f}$, where (f=1, ..., F) is $2 \times 4$ projection matrix related to object i in the $f_{th}$ frame. Assuming that each object is well formed, for example, at least 4 non-coplanar points are detected on the nondegenerate case of each object. Thus, the $n_i$ columns of $W_i$ reside in a 4D subspace spanned by the columns of $M_i$. If the entire feature points from the different N objects are put into a 2F×P matrix W, $$W = [W_1 \ W_2 \ \cdots \ W_N] \quad (4)$$

$$= [M_1 \ M_2 \ \cdots \ M_N] \cdot \begin{bmatrix} S_1 & 0 & \cdots & 0 \\ 0 & S_2 & \cdots & 0 \\ \cdots & \cdots & \cdots & \cdots \\ 0 & 0 & \cdots & S_N \end{bmatrix}$$

where $$P = \sum_{i=1}^{N} n_i$$

is the total number of trajectories in the scene. Assuming the motions of all the N objects are independent, the rank of W is 4N. Given only the observation W, we can determine M and S up to a linear transform because M·A and $A^{-1}$ S satisfy the factorization for any invertable A. However, the shape matrix can be computed from W by singular value decomposition as shown in Equation 5 below.

$$W = U \Sigma V^T \quad (5)$$

where U is 2F×4N, Σ is 4N×4N, and V is P×4N. The shape matrix is computed as $Q=VV^T$. Costeira and Kanade (A Multibody Factorization method for Independently Moving-Objects," International Journal on Computer Vision, pp. 159-179, 1998) have shown:

$$Q_{i,j} \begin{cases} = 0 & \text{if trajectory } i \text{ and } j \text{ belong to different object} \\ \neq 0 & \text{if trajectory } i \text{ and } j \text{ belong to same object} \end{cases} \quad (6)$$

The shape energy, $Q_{i,j}^2$ measures the likelihood of two trajectories belonging to the same motion group or cluster. The closer the value is to zero, the less likely the trajectories are from the same motion group or cluster. Given the $Q^2$ matrix, it naturally fits into the graph-based spectral clustering framework. The weighted trajectory graph is constructed such that the vertices representing the trajectories are assigned the weight of edge e (i,j) to be $Q_{i,j}^2$. With this trajectory graph representation, normalized cut algorithm derived from Shi and Malik ("Normalized Cuts and Image Segmentation," IEEE Transactions on Pattern Analysis and Machine Intelligence 22(8), pp. 888-905, 2000) and can be applied to clustering the trajectories, as derived from Shi and Malik, solving the general Eigen vector of the following equations, $$L \cdot q = \lambda D \cdot q \quad (7)$$

where L is the Laplacian matrix of the graph and D is the diagonal matrix such $D(i, i) = \Sigma_j W(i, j)$. The second smallest generalized Eigen vector gives the relaxed cluster membership value. By thresholding the relaxed cluster membership value, the graph is clustered.

It is known from Gruber and Weiss ("Incorporating Non-Motion Cues into 3D Motion Segmentation," Proc. of ECCV, May 2006) that motion-shape factorization and the shape matrix, Q, are not very robust. The quality of the result deteriorates dramatically when the level of noise increases. Gruber and Weiss further describe that trajectory clustering results can be improved by integrating other non-motion cues. Non-motion cues or reference points can be extracted from a frame set to assist in clustering the linked trajectories. One useful cue or reference point in relating two trajectories is the geometric closeness of the trajectories, where the closer the two trajectories are, the more likely they belong to the same motion group or object. In the current example, geometric closeness is a weighting factor of the motion similarity. The final motion similarity matrix maybe shown in Equation (8) below defined as:

$$W(i,j) = Q^2(i,j) \cdot g(\|T_i - T_j\|) \quad (8)$$

where $g(\|T_i - T_j\|)$ is Gaussian kernel weighting function. Plugging W in the N-cut Equation (7), where the trajectory clusters can be determined.

After trajectory clustering and spatiotemporal region formation, representative trajectories are selected or extracted from the salient object spatiotemporal regions (block 108). In other words, a representative feature index may be extracted from the clustered trajectory information generated at block 106.

Figure 4A:
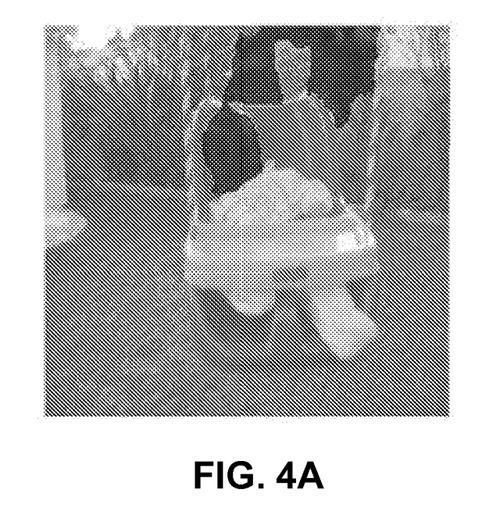
FIG. 4A depicts an example video frame of a child in a swing.
Figure 4B:
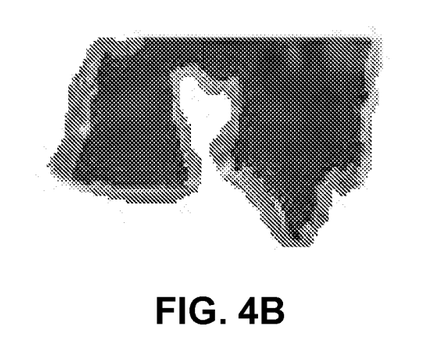
FIG. 4B is a view of a background spatial region extracted from the example video frame of FIG. 4A.
Figure 4C:
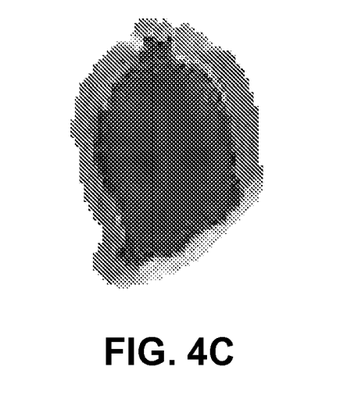
FIG. 4C is a view of a moving object spatial region extracted from the example video frame of FIG. 4A.

FIG. 4A, depicts a frame extracted from an example video element to be processed to determine spatial temporal regions. After establishing a set of interest points and chaining or linking them across adjacent frames, the trajectories obtained for the interest points are clustered into foreground and background clusters. As depicted in FIG. 4A, the video element depicts a child in a swing. When processing this image, the clustered trajectories determine the significant regions described by the interest points as shown in FIG. 4B and FIG. 4C. FIG. 4B is a view of a spatial temporal region extracted from the sample video, displaying a background region. Similarly, FIG. 4C is a view of a spatial temporal region extracted from the sample video, displaying a moving object or foreground region. FIGS. 4B and 4C compose a significant portion of the overall video element, or the portions that accurately describe the video element.

Figure 5A:
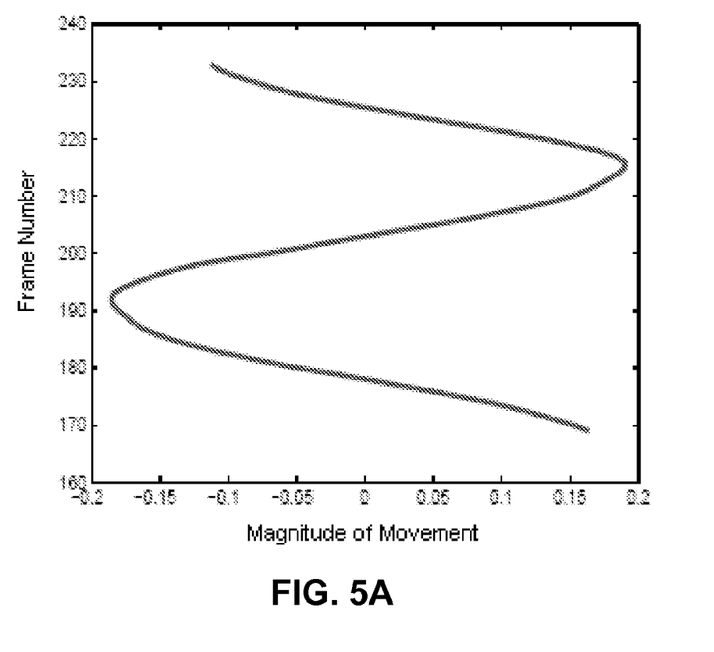
FIG. 5A is view of an example trajectory obtained from a video element.

Once the trajectories have been clustered they are used to extract the representative feature index as depicted by way of example in connection with FIG. 5A. Extraction of the representative feature index from the trajectories results in a motion component for the selected interest points. Such motion components can be used to search and retrieve video elements. FIG. 5A is view of an example trajectory obtained from the video element depicted in FIG. 3. In this example, the video element contains an image of a child swinging, and when processed using the example methods described herein, the pendulum-like motion of the swinging child results a sinusoidal wave shaped trajectory such as that shown in FIG. 5A. More specifically, FIG. 5A shows the projected moving trajectories for the spatiotemporal face region of the baby. The vertical axis of the graph shown in FIG. 5A corresponds to frame number or time and the horizontal axis corresponds to the principle direction of magnitude for the trajectory in the x-y plane.

Figure 5B:
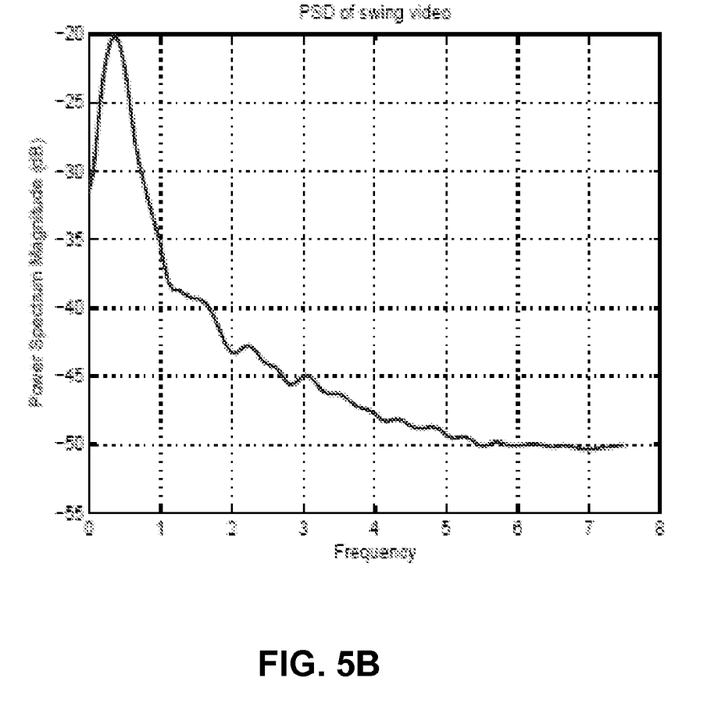
FIG. 5B is a graph of an example power spectrum density obtained from the example trajectory of FIG. 5A.

FIG. 5B depicts the power spectrum density (PSD) of the example trajectory of FIG. 5A. As can be seen from FIG. 5B, the PSD is a useful feature for indexing of a swinging motion and, thus, may be use to perform a video retrieval process. In one example retrieval method, the features for indexing are extracted in two steps. In a first step, the trajectories are projected onto the dominant moving direction shown in FIG. 5A and in a second step, the PSD of the projected trajectories is extracted. The final feature vector includes the magnitudes in the two orthogonal moving directions and the PSD vector. If a 256 point FFT is used to compute the PSD, the final feature vector is of length 258. Preferably, the extracted feature index is rotation and shift invariant, which enables the retrieval of the video captured in different viewing angles.

More specifically, in a frequency representation, the periodic motion of the swinging child video represents the same video element even if there is a change in viewing angle or if the time reference changes. In comparison to the original video element, any variation will still be retrievable by comparing the same characteristics for the relative power spectrum densities for each video element. This will enable the same video element to be properly referenced against similar elements in a video library.

Figure 6:
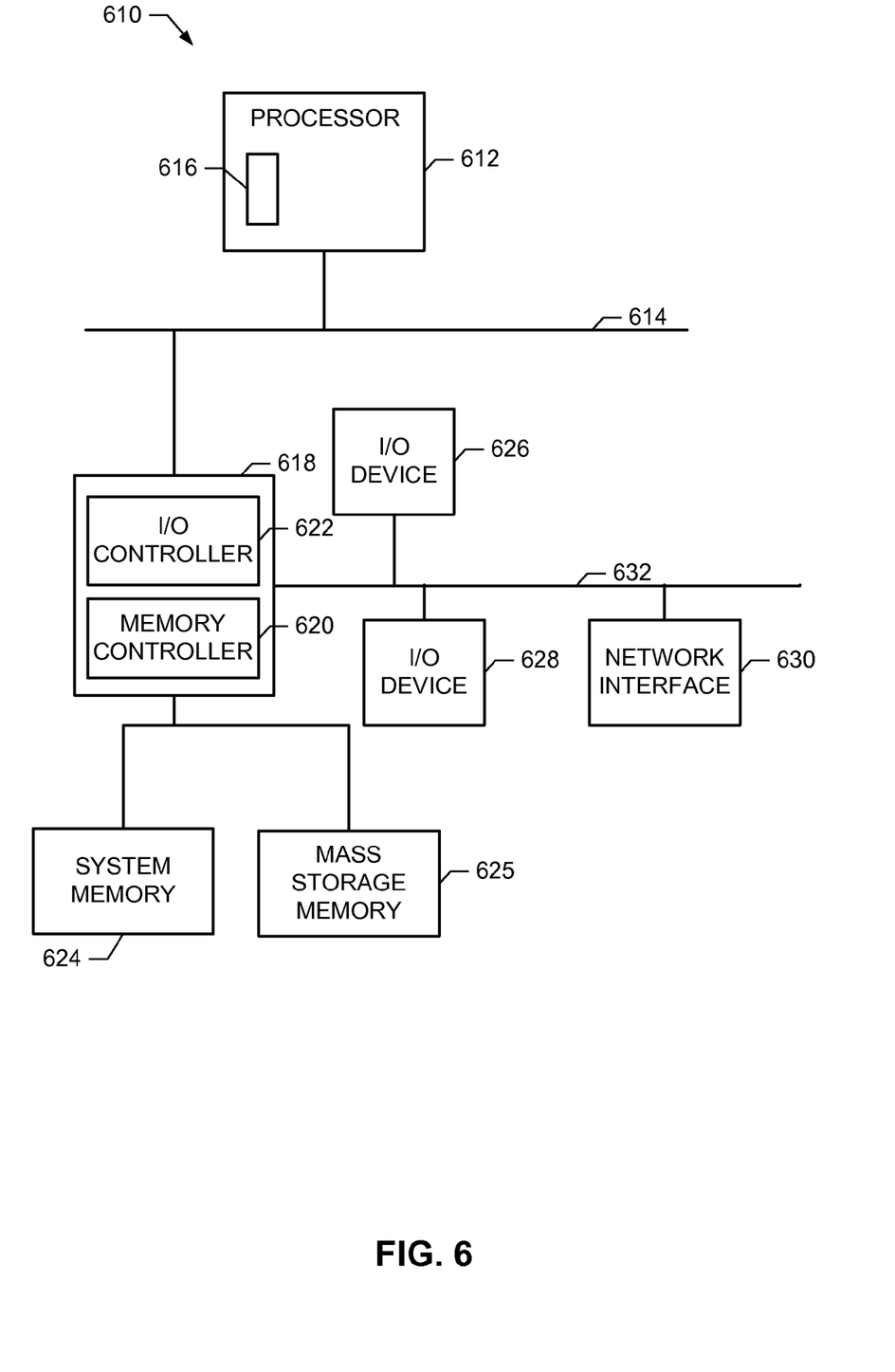
FIG. 6 is a block diagram of an example processor system that may execute the example methods described herein.

FIG. 6 is a block diagram of an example processor system 610 that may be used to implement the apparatus and methods described herein. As shown in FIG. 6, the processor system 610 includes a processor 612 that is coupled to an interconnection bus 614. The processor 612 includes a register set or register space 616, which is depicted in FIG. 6 as being entirely on-chip, but which could alternatively be located entirely or partially off-chip and directly coupled to the processor 612 via dedicated electrical connections and/or via the interconnection bus 614. The processor 612 may be any suitable processor, processing unit or microprocessor. Although not shown in FIG. 6, the system 610 may be a multi-processor system and, thus, may include one or more additional processors that are identical or similar to the processor 612 and that are communicatively coupled to the interconnection bus 614.

The processor 612 of FIG. 6 is coupled to a chipset 618, which includes a memory controller 620 and an input/output (I/O) controller 622. As is well known, a chipset typically provides I/O and memory management functions as well as a plurality of general purpose and/or special purpose registers, timers, etc. that are accessible or used by one or more processors coupled to the chipset 618. The memory controller 620 performs functions that enable the processor 612 (or processors if there are multiple processors) to access a system memory 624 and a mass storage memory 625.

The system memory 624 may include any desired type of volatile and/or non-volatile memory such as, for example, static random access memory (SRAM), dynamic random access memory (DRAM), flash memory, read-only memory (ROM), etc. The mass storage memory 625 may include any desired type of mass storage device including hard disk drives, optical drives, tape storage devices, etc.

The I/O controller 622 performs functions that enable the processor 612 to communicate with peripheral input/output (I/O) devices 626 and 628 and a network interface 630 via an I/O bus 632. The I/O devices 626 and 628 may be any desired type of I/O device such as, for example, a keyboard, a video display or monitor, a mouse, etc. The network interface 630 may be, for example, an Ethernet device, an asynchronous transfer mode (ATM) device, an 802.11 device, a DSL modem, a cable modem, a cellular modem, etc. that enables the processor system 610 to communicate with another processor system.

While the memory controller 620 and the I/O controller 622 are depicted in FIG. 6 as separate functional blocks within the chipset 618, the functions performed by these blocks may be integrated within a single semiconductor circuit or may be implemented using two or more separate integrated circuits.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method comprising:
extracting interest point data from data representing a plurality of video frames, wherein the interest point data is extracted from each of the video frames independent of the other video frames;
subsequent to the extracting of the interest point data, linking at least some of the interest point data to generate corresponding trajectory information by:
linking first interest point data from a first video frame to second interest point data from a second video frame that is separated from the first video frame by a quantity of intermediate video frames, and
linking third interest point data from the second video frame to fourth interest point data from a third video frame that is separated from the second video frame by the same quantity of intermediate video frames;
clustering the trajectory information to form clustered trajectory information;
extracting, via a processor, a representative feature index from the clustered trajectory information; and
indexing the video frames in a database to be searchable based on the representative feature index.

2. The method as defined in claim 1, wherein extracting the interest point data from the data representing the plurality of video frames comprises extracting a set of distinct points from each of the video frames.

3. The method as defined in claim 1, wherein extracting the representative feature index from the clustered trajectory information comprises decomposing video data into a plurality of spatiotemporal regions.

4. The method as defined in claim 1, wherein linking at least some of the interest point data to generate corresponding trajectory information comprises linking data between at least two of the video frames.

5. The method as defined in claim 4, wherein linking the data between the at least two of the video frames comprises comparing similarity scores associated with the video frames and forming a link between the at least two frames based on the comparison.

6. The method as defined in claim 1, wherein clustering the trajectory information comprises clustering the trajectory information into at least one of foreground or background clusters.

7. The method as defined in claim 1, wherein clustering the trajectory information comprises clustering the trajectory information based on at least one of temporal or spatial information.

8. The method as defined in claim 7, wherein at least one of the temporal or spatial information comprises clues.

9. A method comprising:
processing a plurality of video frames composing a video segment to extract spatial information from each of the video frames;
subsequent to processing the plurality of video frames to extract the spatial information, linking at least some of the spatial information between at least some of the video frames to generate trajectory information by:
linking first interest point data from a first video frame to second interest point data from a second video frame that is separated from the first video frame by a quantity of intermediate video frames, and
linking third interest point data from the second video frame to fourth interest point data from a third video frame that is separated from the second video frame by the same quantity of intermediate video frames;

extracting, via a processor, a representative feature index from the trajectory information; and indexing the video frames in a database to be searchable based on the representative feature index.

10. The method as defined in claim 9, wherein processing the plurality of video frames to extract the spatial information comprises extracting a set of distinct points from each of the video frames.

11. The method as defined in claim 9, wherein extracting the representative feature index from the trajectory information comprises decomposing video data into a plurality of spatiotemporal regions.

12. The method as defined in claim 9, wherein linking the at least some of the spatial information to generate the trajectory information comprises linking data between at least two of the video frames.

13. An article of manufacture storing machine accessible instructions which, when executed, cause a machine to:

process a plurality of video frames composing a video segment to extract spatial and temporal information from each of the video frames;

subsequent to processing the video frames, extract the spatial information, linking at least some of the spatial information between at least some of the video frames to generate trajectory information by:

linking first interest point data from a first video frame to second interest point data from a second video frame that is separated from the first video frame by a quantity of intermediate video frames, and linking third interest point data from the second video frame to fourth interest point data from a third video frame that is separated from the second video frame by the same quantity of intermediate video frames;

extract a representative feature index from the trajectory information; and index the video frames in a database to be searchable based on the representative feature index.

14. The article of manufacture as defined in claim 13, wherein the instructions, when executed, cause the machine to process the plurality of video frames to extract the spatial information by extracting a set of distinct points from each of the video frames.

15. The article of manufacture as defined in claim 14, wherein the instructions, when executed, cause the machine to extract the representative feature index from the trajectory information by decomposing video data into a plurality of spatiotemporal regions.

* * * * *